United States Patent
Sarkar (10) Patent No.: US 11,032,662 B2
(45) Date of Patent: Jun. 8, 2021

(54) ADJUSTING AUDIO CHARACTERISTICS FOR AUGMENTED REALITY

(71) Applicant: QUALCOMM Incorporated, San Diego, CA (US)

(72) Inventor: Saurjya Sarkar, Kolkata (IN)

(73) Assignee: Qualcomm Incorporated, San Diego, CA (US)

( * ) Notice: Subject to any disclaimer, the term of this patent is extended or adjusted under 35 U.S.C. 154(b) by 164 days.

(21) Appl. No.: 15/993,365

(22) Filed: May 30, 2018

(65) Prior Publication Data

US 2019/0373395 A1    Dec. 5, 2019

(51) Int. Cl.
*H04S 7/00* (2006.01)
*G06T 19/00* (2011.01)
(Continued)

(52) U.S. Cl.
CPC ............ *H04S 7/304* (2013.01); *G06T 15/005* (2013.01); *G06T 19/006* (2013.01); *H04S 3/008* (2013.01);
(Continued)

(58) Field of Classification Search
CPC . G06T 15/005; G06T 19/006; G06T 2200/04; G06T 15/10; G06T 2207/10004; H04S 7/304; H04S 3/008; H04S 2400/01; H04S 2400/11; H04S 7/30; H04S 7/305; H04S 7/302; G06F 3/16
See application file for complete search history.

(56) References Cited

U.S. PATENT DOCUMENTS 9,858,722 B2    1/2018   Fei et al.
2013/0222369 A1*  8/2013  Huston ................... G06T 17/00
                                                            345/419
(Continued)

FOREIGN PATENT DOCUMENTS

WO    2017087650 A1    5/2017
WO    2017127571 A1    7/2017

OTHER PUBLICATIONS

Benchoff B., "3D Mapping of Huge Areas with a Kinect" Hackaday, Jun. 1, 2012, Retrieved from internet on Feb. 22, 2018, https://hackaday.com/2012/06/01/3d-mapping-of-huge-areas-with-a-kinect/, pp. 1-11.

(Continued)

*Primary Examiner* — Jennifer Mehmood
*Assistant Examiner* — Andrew Shin
(74) *Attorney, Agent, or Firm* — Moore IP (57) ABSTRACT

An augmented reality (AR) device includes a memory configured to store instructions of an augmented reality (AR) application. The AR device further includes a processor configured to initiate a first image capture operation to generate first image data and to determine a three-dimensional (3D) map based on the first image data. The 3D map represents a set of locations including a first location. The processor is further configured to initiate a second image capture operation to generate second image data and to execute the instructions to identify, based on the second image data, a second location of the set of locations. The processor is further configured to modify an audio signal to synthesize one or more acoustic characteristics associated with audio sent from the first location to the second location.

30 Claims, 4 Drawing Sheets

(51) Int. Cl.
*G06T 15/00* (2011.01)
*H04S 3/00* (2006.01)

(52) U.S. Cl.
CPC ....... *G06T 2200/04* (2013.01); *H04S 2400/01* (2013.01); *H04S 2400/11* (2013.01)

(56) References Cited

U.S. PATENT DOCUMENTS

| | | | |
|---|---|---|---|
| 2015/0245159 A1* | 8/2015 | Osman | H04S 7/304 |
| | | | 381/303 |
| 2015/0373477 A1* | 12/2015 | Norris | H04R 5/04 |
| | | | 381/303 |
| 2017/0070820 A1 | 3/2017 | Behringer | |
| 2017/0223478 A1 | 8/2017 | Jot et al. | |
| 2017/0357476 A1* | 12/2017 | Dack | G06F 3/165 |

OTHER PUBLICATIONS

Benchoff B., "3D Scanning Entire Rooms with a Kinect", Hackaday, Dec. 10, 2015, Retrieved from internet on Feb. 22, 2018, https://hackaday.com/2015/12/10/3d-scanning-entire-rooms-with-a-kinect/, pp. 1-8.

Betbeder L., "Near-field 3D Audio Explained," Oculus Developer Blog, Sep. 19, 2017, Retrieved from the Internet URL: https://developer.oculus.com/blog/near-field-3d-audio-explained/ , Retrieved on Feb. 22, 2018, 9 pages.

Chen C., et al., "Low Cost and Efficient 3D Indoor Mapping Using Multiple Consumer RGB-D Cameras," The International Archives of the Photogrammetry, Remote Sensing and Spatial Information Sciences, vol. XLI-B1, Jul. 12-19, 2016, pp. 169-174.

Danklefsen A., "OpenAL's EFX", Gamasutra, Retrieved from internet on Feb. 22, 2018, https://www.gamasutra.com/blogs/AllenDanklefsen/20101112/88453/OpenALs_EFX.php, pp. 1-5.

Jot J-M., et al., "Augmented Reality Headphone Environment Rendering", Audio Engineering Society, Conference Paper, 2016, 6 Pages.

Peacock D., et al., "Effects Extension Guide," Open AL, Creative Technology Limited, 2006, pp. 1-144.

Whelan T., et al., "Kintinuous: Spatially Extended KinectFusion," CSAIL Technical Reports, 2012, 8 pages.

\* cited by examiner

ADJUSTING AUDIO CHARACTERISTICS FOR AUGMENTED REALITY

I. FIELD

This disclosure is generally related to electronic devices and more particularly to electronic devices that adjust audio characteristics for augmented reality (AR) applications.

II. DESCRIPTION OF RELATED ART

Electronic devices may provide audio to users. For example, a user may utilize an electronic device to listen to music, conduct a telephone conversation, or play a video game.

In certain augmented reality (AR) applications, audio may be customized based on an environment of a user (e.g., to simulate or "augment" the environment). To illustrate, a user may wear a headset device while playing an AR game, and the headset device may present graphics that simulate or augment the environment, audio that simulates or augments the environment, or both. As a particular example, if a room has a particular acoustic characteristic (e.g., a large amount of reverberation due to a high ceiling of the room), then the audio may be modified to simulate the particular acoustic characteristic (e.g., by applying a reverb effect to the audio) so that the audio appears "real" to the user.

Acoustic characteristics of different environments may be determined by testing for certain environmental characteristics that differ for various environments. For example, in some applications, a test signal may be generated in an environment (e.g., a room or a theater) to determine an impulse response associated with the environment. After determining the impulse response, audio may be modified (e.g., equalized) in response to evaluating the particular impulse response. As an illustrative example, if the impulse response indicates that the environment attenuates high frequencies, then high frequencies may be attenuated in the audio to simulate the environment so that the audio appears "real" to a user.

In some circumstances, an impulse response based technique may be expensive or infeasible. For example, generation of a test signal and analysis of an impulse response may involve expensive equipment. As another example, an impulse response based technique may be ineffective in cases where a user rapidly changes locations (e.g., where the user moves between rooms while playing an AR game).

III. SUMMARY

In an illustrative example, an augmented reality (AR) device includes a memory configured to store instructions of an augmented reality (AR) application. The AR device further includes a processor configured to initiate a first image capture operation to generate first image data and to determine a three-dimensional (3D) map based on the first image data. The 3D map represents a set of locations including a first location. The processor is further configured to initiate a second image capture operation to generate second image data and to execute the instructions to identify, based on the second image data, a second location of the set of locations. The processor is further configured to modify an audio signal to synthesize one or more acoustic characteristics associated with audio sent from the first location to the second location.

In another example, a method includes performing, at an AR device, a first image capture operation to generate first image data. A 3D map representing a set of locations including a first location is determined based on the first image data. The method further includes performing a second image capture operation to generate second image data at the AR device. A second location of the set of locations is identified based on the second image data. The method further includes modifying an audio signal at the AR device to synthesize one or more acoustic characteristics associated with audio sent from the first location to the second location.

In another example, a computer-readable medium stores instructions executable by a processor to initiate, perform, or control operations. The operations include performing, at an AR device, a first image capture operation to generate first image data. A 3D map representing a set of locations including a first location is determined based on the first image data. The operations further include performing a second image capture operation to generate second image data at the AR device. A second location of the set of locations is identified based on the second image data. The operations further include modifying an audio signal at the AR device to synthesize one or more acoustic characteristics associated with audio sent from the first location to the second location.

In another example, an apparatus includes means for storing instructions of an AR application. The apparatus further includes means for executing the instructions to initiate a first image capture operation to generate first image data and to determine a 3D map based on the first image data. The 3D map represents a set of locations including a first location. The means for executing is configured to initiate a second image capture operation to generate second image data, to execute the instructions to identify, based on the second image data, a second location of the set of locations, and to modify an audio signal to synthesize one or more acoustic characteristics associated with audio sent from the first location to the second location.

V. DETAILED DESCRIPTION

Aspects of the disclosure are related to an augmented reality (AR) device (e.g., an AR headset) that uses image data to generate a three-dimensional map and to identify locations within the 3D map. The AR device is configured to modify an audio signal to synthesize characteristics of sound travel between the locations (e.g., in order to "simulate" the sound travel in an AR game played by a user). As an example, the AR device may artificially reverberate, mix, filter, or attenuate the audio signal to synthesize characteristics of sound from a first location (e.g., an audio source location) to a second location (e.g., a user location) so that a user perceives the audio signal as being "real."

As a particular illustrative example, an AR game may provide audio to a user that simulates a particular sound, such as a knock at a door of a room. The AR device may capture an image that depicts the door and may modify an audio signal based on the image. For example, the AR device may perform an image recognition operation to detect a material (e.g., a wood material or a metal material) of the door and may modify and/or generate an audio signal based on the material, such as by modifying the audio signal to simulate knocking on wood or metal, by using a pre-recorded sample for the identified object, or by procedurally generating an audio signal to simulate an impact noise on the identified object.

Use of the image data to determine adjustment of an audio signal may simulate effects of one or more other techniques (e.g., an impulse response based technique) without use of certain equipment or calculations associated with the other techniques. For example, by using the image data to "match" features in an environment to certain acoustic characteristics, an AR device may avoid generation of a test signal and analysis of an impulse response that involves expensive equipment, which may be infeasible in certain AR applications, such as where the equipment cannot be integrated within a head-mounted AR headset. As another example, an impulse response based technique may be sensitive to positioning of a source of the test signal, which may be avoided using the image data instead of the test signal. As an additional example, use of the image data may enable faster tracking of a dynamic environment (or a change between environments), such as when a user moves from inside to outside a building or from one room to another room of the building, as illustrative examples. Alternatively or in addition, audio associated with movement of and/or impact on an object may be simulated, such as by simulating the sound of a door or window opening or closing during the AR game.

As another example, use of the image data may enable increased precision (e.g., "granularity") of audio adjustment. For example, use of the image data may enable the AR device to separately simulate effects of a direct path from an audio source to a user location (e.g., through an object), an indirect path from the audio source to the user location (e.g., around the object), an early reflection characteristic, a late reflection characteristic, one or more other effects, or a combination thereof. As a result, audio may be adjusted more precisely as compared to certain other techniques that "globally" adjust audio parameters based on an "average" characteristic of an environment.

Figure 1:
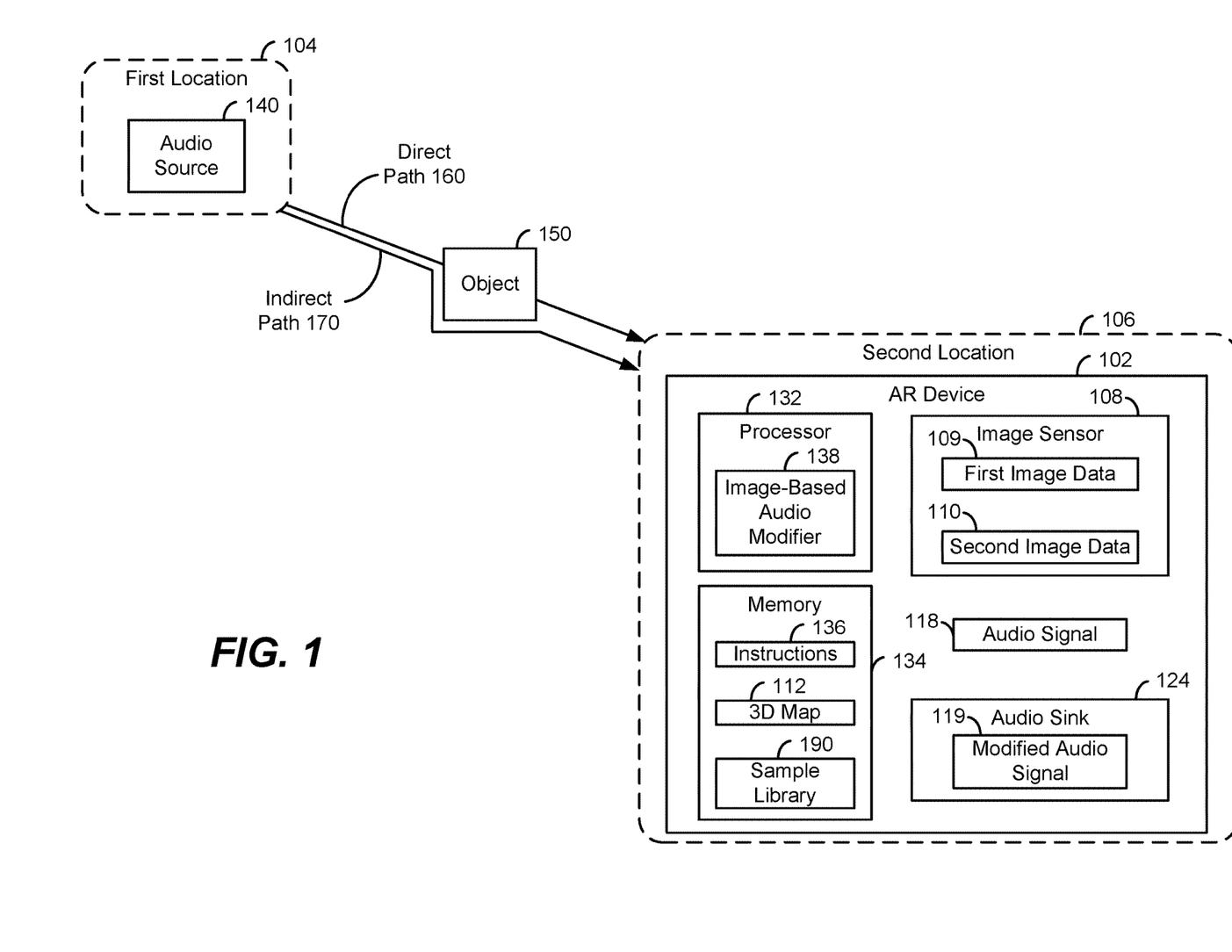
FIG. 1 is a diagram of an illustrative example of a system that includes an augmented reality (AR) device configured to modify an audio signal based on image data.

Referring to FIG. 1, aspects of a particular example of an augmented reality (AR) device configured to modify an audio signal based on image data are depicted and generally designated 102. In an illustrative example, the AR device 102 may include or correspond to a wearable device, such as a headset (e.g., "goggles") worn by a user in connection with an AR application. In other examples, the AR device 102 may include or correspond to another device, such as a handheld AR device, as an illustrative example. As used herein, "AR" is used to include AR and virtual reality (VR) applications. As used herein, an "AR device" is used to refer to a device that enables a user to engage in an AR application, such as an AR game.

The AR device 102 includes a memory 134 configured to store instructions 136 of an AR application. The AR device 102 further includes a processor 132 configured to execute the instructions 136.

The example of FIG. 1 also depicts that the AR device 102 includes one or more image sensors (e.g., an image sensor 108). In a particular example, the image sensor 108 includes a camera, such as a charge-coupled device (CCD) camera, a complementary metal-oxide-semiconductor (CMOS) camera or an n-type metal-oxide-semiconductor (NMOS) camera. Alternatively or in addition, the image sensor 108 may include one or more other sensors, such as an infrared sensor. In a particular example, the image sensor 108 includes a red, green, blue, and infrared (RGB-IR) camera. Alternatively or in addition, the AR device 102 may include one or more other sensors or devices configured to determine (or estimate) depth, size, movement, and location. For example, the AR device 102 may include a global positioning system (GPS) sensor, a gyroscopic sensor, a compass, an accelerometer, a geo-positioning sensor, a short-range radio, a radio that complies with a Bluetooth (BT) protocol or a Bluetooth Low Energy (BLE) protocol (Bluetooth is a trademark of Bluetooth Special Interest Group (SIG) of Kirkland, Wash.), a radio that complies with a Wi-Fi protocol, (Wi-Fi is a trademark of the Wi-Fi Alliance of Austin, Tex.), a sonar device, an audio fingerprinting device, one or more other sensors or devices, or a combination thereof. The image sensor 108 may include one or more image sensors (or other sensors) configured to generate data related to objects within the field of view of the user of the AR device 102, outside the field of view of the user, or a combination thereof.

FIG. 1 also illustrates that the AR device 102 may include an audio sink 124, such as one or more speakers. In a particular example, the audio sink 124 includes multiple speakers configured to generate stereo sound. The audio sink 124 may include one or more speakers configured to fit inside, outside, or around an ear of a user (e.g., an "ear bud" speaker), one or more external speakers, or a combination thereof. To further illustrate, the AR device 102 may correspond to or include a wearable device (e.g., a headset) having at least a portion configured to engage (e.g., wrap around or fit inside) the ear of the user.

During operation, the processor 132 is configured to initiate a first image capture operation to generate first image data 109. To illustrate, the image sensor 108 may be configured to perform the first image capture operation to generate the first image data 109 in response to an instruction from the processor 132. In an illustrative example, the first image capture operation is performed by the AR device 102 during a calibration process during which a user performs a "walk through" of one or more geographic areas while the image sensor 108 captures images or video to generate the first image data 109. To illustrate, upon executing the instructions 136 (e.g., in response to user input to load an AR game or other AR application), the AR device 102 may prompt the user to walk about surroundings of the user to enable the AR device 102 to capture images or record video.

The AR device 102 is configured to generate and store data representing a three-dimensional (3D) map 112 based on the first image data 109. The 3D map 112 represents a set of locations including a first location 104 (e.g., an audio source location of an audio source to be simulated), which may be included within a particular geographic area, such as a building (or a region within a building). In a particular example, the processor 132 is configured to determine the 3D map 112 by stitching together multiple images included in the first image data 109 to generate a composite image of the set of locations using a panoramic image synthesis technique.

In another example, data representing the 3D map 112 (or a portion of the 3D map 112) may be received by the AR device 102 from another device, such as a server. For example, the AR device 102 may "offload" the first image data 109 to a server to generate the 3D map 112 and may receive the 3D map 112 from the server. In some examples, the server may provide a file having a particular file format to the AR device 102, and the file may represent the 3D map 112. As a particular illustrative example, the file may correspond to a program (or a program installer) that is executable by the AR device and that represents the 3D map 112.

The set of locations represented by the 3D map 112 further includes a second location 106. As a non-limiting illustrating example, the first location 104 may correspond to a first room of a building or a first region within a particular room, and the second location 106 may correspond to a second room of the particular building or a second region within the particular room.

In an illustrative example, the 3D map 112 is generated by the AR device 102 during a calibration process during which a user performs a "walk through" of the geographic area while the image sensor 108 captures images to build the 3D map 112. To illustrate, upon executing the instructions 136, the AR device 102 may prompt the user to walk about surroundings of the user to enable the AR device 102 to capture images or to record video in order to generate (e.g., "build") the 3D map 112. In the example of FIG. 1, the surroundings include the first location 104 and the second location 106.

To further illustrate, the 3D map 112 may indicate one or more rooms of a building that are each identified using the first image data 109. The 3D map 112 may indicate dimensions (e.g., length, width, and height) of one or more rooms. For example, the AR device 102 may include an infrared sensor configured to determine the dimensions using an infrared sensing technique. In a particular example, the infrared sensor (or another sensor of the AR device 102) is configured to detect presence or location of one or more objects in a room, such as by using an infrared sensing technique to detect presence and location of a piece of furniture.

In some implementations, the processor 132 is configured to map features indicated by the first image data 109 to reference shapes, such as by "simplifying" or "approximating" an object as a plane, a cube, a polygon, a sphere, or a pyramid, as illustrative examples. As a particular example, a wall or a surface may be approximated as one or more planes. In this case, the 3D map 112 may depict the set of locations using reference shapes such as planes, cubes, polygons, spheres, or pyramids.

Alternatively or in addition, the processor 132 may be configured to identify a room represented by the 3D map 112 and to modify the audio signal 118 based on one or more acoustic characteristics that are correlated to dimensions of the room, one or more objects (e.g., a border object) of the room, wall characteristics of the room, or a combination thereof. As referred to herein, an object may correspond to an article within a room (e.g., a piece of furniture) or an article bordering a room (e.g., a door, a window, or a wall). The processor 132 may perform an image recognition operation based on the first image data 109 to detect one or more objects, such as the object 150. As a particular illustrative example, the processor 132 may be configured to execute the instructions 136 to match an object (e.g., a window) represented by the first image data 109 to a reference object shape to detect the object. As another illustrative example, the processor 132 may be configured to execute the instructions 136 to match a door represented by the first image data 109 to a reference door shape to detect the door. The processor 132 may be configured to determine dimensions of the objects (e.g., using an infrared sensor). The 3D map 112 may indicate, for one or more rooms represented by the 3D map 112, one or more objects.

The processor 132 may be configured to detect materials associated with a room or an object in order to synthesize one or more characteristics (e.g., reverberation, absorption, attenuation, or other characteristics) associated with the materials. As an example, the processor 132 may be configured to execute the instructions 136 to determine whether a door includes a wood material or a metal material. In another example the processor 132 is configure to execute the instructions 136 to determine whether a curtain is covering a window. In one example, the processor 132 is configured to execute the instructions 136 to perform an image recognition operation to match a surface indicated by the first image data 109 to a reference surface to identify a material. The 3D map 112 may indicate, for one or more rooms represented by the 3D map 112, one or more materials, such as a surface material of an object.

As used herein, "synthesizing" a characteristic refers to modifying a signal to increase or create the characteristic in the signal. Synthesizing a characteristic may include operations such as simulating the characteristic in the signal, artificially reverberating the signal, performing an acoustic ray tracing operation, adding samples of a prerecorded sound (e.g., speech or other audio, which may be indicated by a template or other data), reducing one or more aspects of the signal (e.g., by filtering a particular frequency or band of frequencies), deleting a portion of the signal (e.g., by deleting a particular portion or sample of the signal), one or more other operations, or a combination thereof. As used herein, "synthesizer" refers to a device (e.g., a circuit, a processor configured to execute instructions, another device, or a combination thereof) configured to synthesize (e.g., simulate) or more characteristics in the signal.

The processor 132 may be configured to determine a status associated with an object in order to synthesize one or more characteristics (e.g., reverberation, absorption, attenuation, or other characteristics) associated with the object. For example, the processor 132 may be configured to execute the instructions 136 to detect a position of a door or a window, such as whether the door or window is open, closed, or ajar. Alternatively or in addition, the processor 132 may be configured to execute the instructions 136 to determine a thickness of an object or a solidity of an object (e.g., whether the object is hollow). As an example, in some implementations, the processor 132 is configured to determine (or estimate) thickness of a wall based on the width of an open door or doorway.

The processor 132 may be configured to determine one or more acoustic parameters associated with an object or a material. For example, the memory 134 may store an acoustic property database that indicates objects and materials and one or more acoustic parameters associated with each object or material. As a particular illustrative example, the acoustic property database may indicate a first set of acoustic properties (e.g., attenuation, absorption, reflection, and reverberation) associated with a wood door and may further indicate a second set of acoustic properties (e.g., attenuation, absorption, reflection, and reverberation) associated with a metal door.

The processor 132 may be configured to associate an object or material represented by the 3D map 112 with one or more acoustic properties indicated by the acoustic property database. As an example, for each detected object of the 3D map 112, the processor 132 may generate metadata of the 3D map 112. The metadata may indicate one or more acoustic properties associated with the corresponding object. As an example, the metadata may indicate a reflectivity of the object, an absorptivity of the object, an attenuation of the object, one or more other characteristics, or a combination thereof. In some examples, each characteristic indicated by the metadata may have a value selected from a range of values. As an example, each characteristic may be "scored" using a range of 0 to 100 (e.g., where a score of 0 indicates low or zero presence of the characteristic, and where a score of 100 indicates a high or "maximum" presence of the characteristic).

In a particular example, the acoustic property database indicates default (or "stock") acoustic properties, and the processor 132 is configured to modify the default acoustic properties based on dimensions or classification of an object or room detected by the AR device 102. As a particular illustrative example, the acoustic property database may indicate that a "stock" wooden door having a reference thickness, length, or breadth is associated with a particular acoustic characteristic. In response to detecting, using the first image data 109, a wooden door having a thickness, length, or breadth that is different from the reference thickness, length, or breadth indicated by the acoustic property database, the processor 132 may execute the instructions 136 to modify the particular acoustic characteristic (e.g., by multiplying a coefficient corresponding to a particular filter characteristic by a factor to "adjust" or "normalize" the particular acoustic characteristic based on the dimensions of the door). Alternatively or in addition, the acoustic property database may include a template (or "profile") associated with an object, and the processor 132 may be configured to access the template to synthesize or generate a sound associated with the object. As an illustrative example, the template may indicate acoustic properties associated with knocking at a metal or wooden door, and the processor 132 may be configured to synthesize or generate a knocking sound at a metal or wooden door based on the particular dimensions of the door and further based on the acoustic properties indicated by the template.

In a particular example, the processor 132 is configured to execute the instructions 136 to determine whether an amount of data generated during the calibration process satisfies a threshold to generate the 3D map 112. For example, the processor 132 may be configured to determine whether a threshold number of images or a threshold duration of video are generated during the calibration process. Alternatively or in addition, the processor 132 may be configured to execute the instructions 136 to determine whether the images or video are sufficient to "stitch together" a composite image of the set of locations, such as using a panoramic image synthesis technique.

In some implementations, the processor 132 is configured to execute the instructions 136 to prompt the user to continue (or resume) the walk through in response to determining that the amount of data fails to satisfy (e.g., is less than) the threshold. The processor 132 may be configured to execute the instructions 136 to prompt the user to discontinue the walk through or to perform another action in response to determining that the amount of data satisfies (e.g., is greater than or equal to) the threshold. As a particular illustrative example, the processor 132 may be configured to execute the instructions 136 to prompt the user to enter a user mode of operation in response to detecting that the calibration process is complete based on the amount of data satisfying the threshold.

The processor 132 is configured to initiate a second image capture operation to generate second image data 110. In a particular example, the image sensor 108 is configured to perform the second image capture operation to generate the second image data 110 during a user mode of operation of the AR device 102 (e.g., after generating the 3D map 112 using the "walk-through" calibration process). As used herein, a "user mode" of operation of a device may refer to a mode of operation of the device engaged in by a user after completion of a setup or calibration process, such as the "walk through" calibration process described with reference to the first image data 109 and the 3D map 112.

The processor 132 is configured to execute the instructions 136 to identify, based on the second image data 110, one or more locations of the set of locations represented by the 3D map 112, such as the second location 106. For example, the second location 106 may correspond to a user location that the processor 132 identifies using the second image data 110 and the 3D map 112 (e.g., by dynamically tracking the user location within the 3D map 112 using image data captured by the image sensor 108 so that acoustic characteristics of the user location can be simulated). To further illustrate, the processor 132 may perform an image recognition operation to "match" representations in the second image data 110 to features of the 3D map 112 to identify the second location 106. As an illustrative example, the processor 132 may identify the second location 106 by "matching" features indicated in the second image data 110 to features represented by the 3D map 112 (e.g., by detecting a threshold number of similar features).

The processor 132 is configured to execute the instructions 136 to modify an audio signal 118 to generate a modified audio signal 119 to synthesize one or more acoustic characteristics associated with audio from the first location 104 to the second location 106 (e.g., so that audio presented to a user appears "real" to the user based on the particular surroundings or environment of the user while playing an AR game). To illustrate, the audio signal 118 may be modified to simulate an audio source 140 at the first location 104, such as knocking at a door while a user is playing an AR game, as an illustrative example. Depending on the particular example, the audio source 140 may correspond to an actual object (e.g., a door that is at the first location) or a virtual object (e.g., a door that is to be displayed to a user in connection with an AR program executed by the AR device 102 while a user plays an AR game).

The audio signal 118 may be modified to simulate particular surroundings or an environment of a user based on the second image data 110. Modifying the audio signal 118 may include one or more of augmenting a sound indicated by the audio signal 118 (e.g., by adding reverb to a knocking sound indicated by the audio signal 118), adding a sound to the audio signal 118 (e.g., by adding a pre-recorded or "canned" knocking sound to the audio signal 118), or replacing a sound indicated by the audio signal 118 (e.g., by replacing one knocking sound with another knocking sound). To further illustrate, the processor 132 may be configured to modify the audio signal 118 by equalizing the audio signal 118, binaurally mixing the audio signal 118, artificially reverberating the audio signal 118, pitch shifting the audio signal 118, resonating the audio signal 118, changing harmonic content or formant structure of the audio signal 118, distorting the audio signal 118, performing one or more other operations, or a combination thereof.

Depending on the particular implementation, the processor 132 may be configured to modify the audio signal 118 based on a direct path 160 from the first location 104 to the second location 106, an indirect path 170 from the first location 104 to the second location 106, or both. To illustrate, the direct path 160 may be through one or more objects, such as the object 150. In this example, the processor 132 may be configured to modify the audio signal 118 to simulate occlusion associated with the audio source 140 due to the one or more objects. Alternatively or in addition, the processor 132 may be configured to modify the audio signal 118 based on the indirect path 170, such as by simulating one or more reflections from a wall or an object, by simulating diffraction of sound around one or more corners of a room or an object, or a combination thereof. The processor 132 may be configured to modify the audio signal 118 based on surroundings and a position of the first location 104 relative to the second location 106 (e.g., by simulating reverberation from an object proximate to the first location 104, the second location 106, or both). Examples of determination of the direct path 160 and the indirect path 170 are described further with reference to FIG. 2.

In one example, the audio signal 118 corresponds to an impact-based sound. To illustrate, the audio source 140 may correspond to a door of a room, and the audio signal 118 may correspond to an impact (e.g., knocking) at the door. The processor 132 may modify the audio signal 118 so that a user perceives audio as originating from the door (e.g., by detecting the door to include a metal material, and by modifying the sound to replicate knocking at the metal door). In this example, the audio signal 118 may include pre-recorded audio samples (e.g., pre-recorded knocking samples), procedurally generated (or recorded) audio samples, or any other type of audio sample to simulate audio from the first location 104 to the second location 106.

In a particular example, the AR device 102 is configured to adjust the audio signal 118 based on a head-related transfer function (HRTF) associated with the user of the AR device 102 and based on the spatial orientation of the user. For example, the AR device 102 may be configured to binaurally mix the audio signal 118 so that the user perceives audio as originating from a particular location (e.g., in front of the user, to the side of the user, behind the user, above the user, or below the user), such as the first location 104 (instead of as originating from the AR device 102).

After modifying the audio signal 118, the AR device 102 is configured to generate an acoustic representation of the modified audio signal 119. For example, in FIG. 1, the audio sink 124 (e.g., one or more speakers) is configured to generate an acoustic representation of the modified audio signal 119.

Although certain aspects of FIG. 1 have been described with reference to the AR device 102, it should be appreciated that certain operations may be performed by another device (alternatively or in addition to the AR device 102). As an example, a second device may be in communication with the AR device 102. The second device may include a gaming console, a computer, or a security camera, as illustrative examples. The second device may include a second image sensor that captures one or more images. The second device may be provided to the AR device 102 (e.g., via a wireless network), and the one or more images may be included in the first image data 109, as an illustrative example.

Use of the image data 109, 110 and the 3D map 112 may increase efficiency of adjusting the audio signal 118 to synthesize (e.g., simulate) characteristics of sound from the first location 104 to the second location 106. As an example, use of the image data 109, 110 and the 3D map 112 may enable faster tracking of a dynamic environment (or a change between environments), such as when the environment outside the field of view of the user changes (e.g., when a door or window in another room opens or closes), which may be difficult or infeasible using other techniques. Use of the image data 109, 110 and the 3D map 112 may also enable more accurate and/or efficient tracking of position and/or orientation of the user within the 3D map as compared to certain other techniques.

Figure 2:
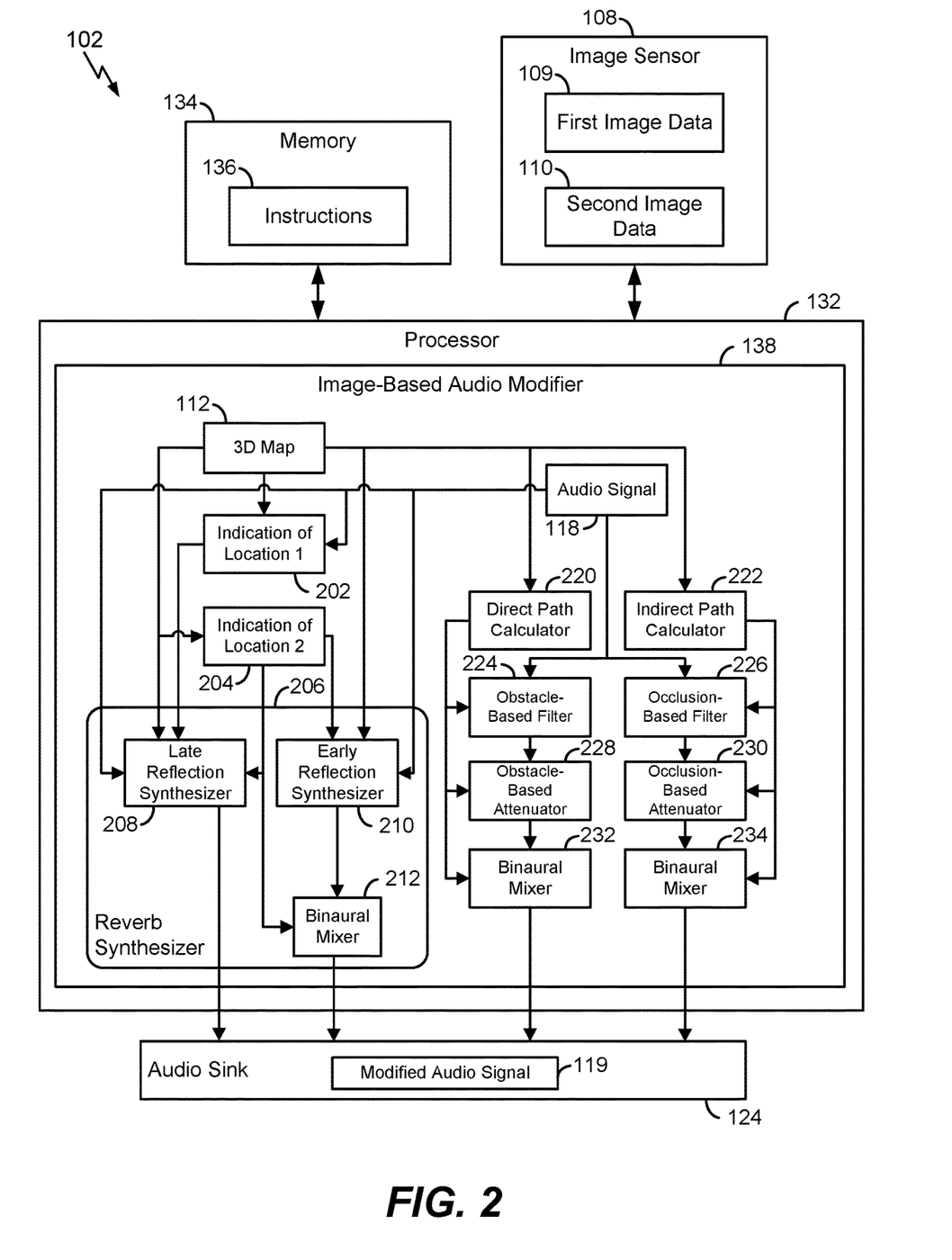
FIG. 2 is diagram of certain illustrative aspects of an example of an AR device, such as the AR device of FIG. 1.

FIG. 2 depicts illustrative aspects of an example of an AR device, such as the AR device 102 of FIG. 1. FIG. 2 depicts that the AR device 102 includes the image sensor 108, the processor 132, the memory 134, and the image-based audio modifier 138.

In the example of FIG. 2, the image-based audio modifier 138 includes a reverb synthesizer 206. The reverb synthesizer 206 may include a late reflection synthesizer 208 and an early reflection synthesizer 210. The reverb synthesizer 206 may further include a binaural mixer 212 coupled to the early reflection synthesizer 210 and to the audio sink 124.

In FIG. 2, the image-based audio modifier 138 includes a direct path calculator 220. The image-based audio modifier 138 may include an obstacle-based filter 224 coupled to the direct path calculator 220. The obstacle-based filter 224 may be configured to receive an output of the direct path calculator 220 and to receive the audio signal 118. The image-based audio modifier 138 may include an obstacle-based attenuator 228 and a binaural mixer 232 that are coupled to the direct path calculator 220. The obstacle-based attenuator 228 may be coupled to an output of the obstacle-based filter 224, and the binaural mixer 232 may be coupled to an output of the obstacle-based attenuator 228. The binaural mixer 232 may be coupled to the audio sink 124.

Alternatively or in addition, the image-based audio modifier 138 may include an indirect path calculator 222. The image-based audio modifier 138 may include an occlusion-based filter 226 coupled to the indirect path calculator 222. The occlusion-based filter 226 may be configured to receive an output of the indirect path calculator 222 and to receive the audio signal 118. The image-based audio modifier 138 may include an occlusion-based attenuator 230 and a binaural mixer 234 that are coupled to the indirect path calculator 222. The occlusion-based attenuator 230 may be coupled to an output of the occlusion-based filter 226, and the binaural mixer 234 may be coupled to an output of the occlusion-based attenuator 230. The binaural mixer 234 may be coupled to the audio sink 124.

The direct path calculator 220 may be configured to determine a direct path from an audio source location to a user location, such as by determining the direct path 160 of FIG. 1. In a particular example, the direct path 160 is through one or more obstacles that are positioned between the AR device 102 and the audio source 140, such as the object 150. The direct path calculator 220 may be configured to provide an indication of the direct path 160 to the obstacle-based filter 224 (e.g., by indicating coordinates of the direct path 160 within the 3D map 112, by indicating a length of the direct path 160, or both). In one example, the direct path calculator 220 is configured to determine the direct path 160 by determining a line segment directly joining a source location (e.g., the first location 104) and a listener location (e.g., the second location 106), which may be through one or more objects or mediums (e.g., obstacles).

The obstacle-based filter 224 may be configured to filter the audio signal 118 based on the direct path 160. For example, the obstacle-based filter 224 may be configured to filter the audio signal 118 based on a frequency response (e.g., a cutoff frequency and a gain) associated with the object 150 based on a type of the object 150 and a distance of the direct path 160. Filtering the audio signal 118 based on the direct path 160 may simulate effects of frequency selectivity of the object 150 to sound propagating through the object 150. As an example, if the object 150 has a particular frequency selectivity characteristic (e.g., low-pass, high-pass, band-pass, or band-reject), the obstacle-based filter 224 may filter the audio signal 118 using one or more corresponding filters (e.g., a low-pass filter, a high-pass filter, a band-pass filter, a band-reject filter, or a combination thereof).

The obstacle-based attenuator 228 may be configured to determine an attenuation associated with the direct path 160 and to modify the audio signal 118 based on the attenuation. The obstacle-based attenuator 228 may be configured to determine the attenuation by summing a first attenuation associated with sound travel through air and a second attenuation associated with sound travel through one or more objects (e.g., the object 150) (e.g., due to absorptivity associated with the one or more objects). In an illustrative example, the obstacle-based attenuator 228 may "roll off" amplitude of the audio signal 118 to simulate attenuation due to absorptivity of the object 150. In a particular example, the obstacle-based attenuator 228 is configured to determine a total amount of attenuation through each medium (e.g., objects or empty space) associated with the direct path 160 and a total amount of attenuation across one or more boundaries between the mediums. In some cases, the obstacle-based attenuator 228 may be configured to attenuate higher frequencies more than lower frequencies (e.g., to simulate different absorptive and reflective characteristics of high frequencies and low frequencies of sound).

The binaural mixer 232 may be configured to mix the audio signal 118 based on the direct path 160. For example, the binaural mixer 232 may be configured to "mix" effects of the obstacle-based filter 224 and the obstacle-based attenuator 228, such as by binaurally mixing the audio signal 118 between the left and right speakers/channels using a HRTF associated with the user in response to the direct path approaching each ear of the user at a particular azimuthal angle and polar angle (e.g., as determined by the position and orientation of the user and as calculated using the direct path 160).

Alternatively or in addition, the indirect path calculator 222 may be configured to determine an indirect path from an audio source location to a user location, such as by determining the indirect path 170 of FIG. 1. In a particular example, the indirect path 170 is around one or more obstacles that are positioned between the AR device 102 and the audio source 140, such as the object 150. In a particular example, the indirect path calculator 222 is configured to determine the indirect path 170 by identifying the shortest path (e.g., a set of line segments) between a source location (e.g., the first location 104) and a listener location (e.g., the second location 106) without crossing an object (e.g., where the line segments are around one or more objects rather than through the one or more objects). In some cases, the indirect path calculator 222 is configured to identify that no indirect path is available (e.g., where an audio source is fully occluded by objects).

The occlusion-based filter 226 may be configured to filter the audio signal 118 based on the indirect path 170. For example, the occlusion-based filter 226 may be configured to filter the audio signal 118 based on sound diffraction characteristics associated with diffraction around one or more objects, such as the object 150. The occlusion-based filter 226 may be configured to filter the audio signal 118 based on a frequency response (e.g., a cutoff frequency and a gain) associated with the object 150, based on an angle of diffraction (e.g., an angle of the indirect path 170 relative to the direct path 160), or both. Filtering the audio signal 118 based on the indirect path 170 may simulate effects of frequency selectivity of the object 150 to sound propagating around the object 150. As an example, if the object 150 has a particular sound diffraction characteristic, the occlusion-based filter 226 may filter the audio signal 118 using one or more corresponding filters (e.g., a low-pass filter, a high-pass filter, a band-pass filter, a band-reject filter, or a combination thereof).

The occlusion-based attenuator 230 may be configured to determine an attenuation associated with the indirect path 170 and to modify the audio signal 118 based on the attenuation. The occlusion-based attenuator 230 may be configured to determine the attenuation by determining a length of the indirect path 170. In an illustrative example, the occlusion-based attenuator 230 may "roll off" amplitude of the audio signal 118 to simulate attenuation associated with sound travel through the indirect path 170.

In a particular example, the occlusion-based attenuator 230 is configured to increase attenuation of the audio signal 118 if the indirect path 170 is through a boundary object. To illustrate, the occlusion-based attenuator 230 may be configured to compare the indirect path 170 (or coordinates associated with the indirect path 170) to the 3D map 112 to determine whether the indirect path 170 is through a boundary object, such as an open window or an open door. In a particular example, the occlusion-based attenuator 230 is configured to attenuate the audio signal 118 based on an opening size of the boundary object (e.g., where the opening size corresponds to a percentage of energy remaining in the audio signal 118 after attenuation of the audio signal 118). Alternatively or in addition, the image-based audio modifier 138 may be configured to perform one or more other operations based on the opening size, such as pitch shifting, damping, or equalization, as illustrative examples.

The binaural mixer 234 may be configured to mix the audio signal 118 based on the indirect path 170. For example, the binaural mixer 234 may be configured to "mix" effects of the occlusion-based filter 226 and the occlusion-based attenuator 230, such as by binaurally mixing the audio signal 118 between the left and right speakers/channels using a HRTF associated with the user in response to the direct path approaching each ear of the user at a given azimuthal angle and polar angle (e.g., as determined by the position and orientation of the user and as calculated using the indirect path 170).

The reverb synthesizer 206 is configured to reverberate the audio signal 118 based on an indication 202 of the first location 104 and further based on an indication 204 of the second location 106. To illustrate, sound from the first location 104 may be associated with a higher order reflection characteristic (e.g., the set of reflections reaching the user after multiple reflections, which may correspond to the reflections that reach the user after a certain time threshold, such as approximately 5 to 100 milliseconds (ms) after generation of the sound, as an illustrative example). Sound from the first location 104 may also be associated with a lower order reflection characteristic (e.g., the set of reflections reaching the user after one or more reflections, which may correspond to the reflections that reach the user before a certain time threshold, such as approximately 5 to 100 ms after generation of the sound, as an illustrative example). The late reflection synthesizer 208 may be configured to modify the audio signal 118 to simulate reflections associated with the higher order reflection characteristic, and the early reflection synthesizer 210 may be configured to modify the audio signal 118 to simulate reflections associated with the lower order reflection characteristic.

The reverb synthesizer 206 may be configured to adjust the audio signal 118 based on characteristics that are relatively "static" (e.g., less sensitive to a user location, such as the second location 106) and also based on characteristics that are relatively "dynamic" (e.g., more sensitive to the user location). For example, the late reflection synthesizer 208 may be configured to adjust the audio signal 118 based on a higher order reflection characteristic associated with a room represented by the 3D map 112. In this example, the higher order reflection characteristic associated with the room may be relatively "static" (e.g., where the higher order reverberation characteristic is uniform for different locations within the room). The early reflection synthesizer 210 may be configured to adjust the audio signal 118 based on a lower order reflection characteristic corresponding to the user location. The lower order reflection characteristic may be more "dynamic" and may be associated with sound reaching a listener "earlier" as compared to the higher order reflection characteristic (due to fewer reflections associated with the lower order reflection characteristic). The lower order reflection characteristic may also be directional and may be mixed binaurally. The lower order reflection characteristic may be more sensitive to user location and orientation as compared to the higher order reflection characteristic.

In some implementations, each room indicated by the 3D map 112 is associated with one or more "static" parameters, the audio signal 118 may be adjusted based on one more or static parameters associated with a particular room that includes the first location 104, the second location 106, or both. The reverb synthesizer 206 may be configured to identify, based on the first location 104 or the second location 106, a particular room represented by the 3D map 112 and to determine one or more "static" parameters based on the particular room.

To further illustrate, the reverb synthesizer 206 may be configured to modify the audio signal 118 based on one or more parameters. The one or more parameters may include reverb density, reverb diffusion, late reverb gain, late reverb delay, late reverb panning, early reflection reverb gain, early reflection reverb delay, early reflection reverb panning, reverb high frequency gain, reverb low frequency gain, reverb decay time, a ratio of high frequency reverb decay to low frequency reverb decay, one or more other parameters, or a combination thereof.

In a particular example, reverb density, reverb diffusion, late reverb gain, reverb low frequency gain, reverb decay time, and the ratio of high frequency reverb decay to low frequency reverb decay may correspond to relatively "static" parameters. For example, each room indicated by the 3D map 112 may be associated with a respective reverb density, reverb diffusion, late reverb gain, reverb low frequency gain, reverb decay time, and ratio of high frequency reverb decay to low frequency reverb decay.

In some circumstances, a region including the first location 104 may differ from a room including the second location 106. As a particular example, the first location 104 may be included in a first room, the second location 106 may be included in a second room. The object 150 may correspond to a door between the first room and the second room, and the audio signal 118 may be modified to include a knocking sound to simulate knocking at the door. The reverb synthesizer 206 may be configured to compare the indication 202 to the indication 204 to determine whether the locations 104, 106 correspond to a common room or to different rooms. In response to determining that the locations 104, 106 correspond to different rooms, the reverb synthesizer 206 may be configured to adjust late reverb gain, late reverb delay, late reverb panning (e.g., to simulate late reverberation characteristics associated with sound travel from one room to another room).

The reverb synthesizer 206 may be configured to adjust the audio signal 118 based on proximity of the AR device 102 (or a user of the AR device 102) to one or more surfaces. For example, the reverb synthesizer 206 may adjust one or more early reflection characteristics based on detecting that proximity of the AR device 102 to a surface is less than a threshold. To further illustrate, the AR device 102 may include an infrared sensor configured to determine proximity of the AR device 102 to a surface. In response to determining that the proximity is less than the threshold, the reverb synthesizer 206 may be configured to adjust early reflection reverb gain, early reflection reverb delay, early reflection reverb panning to simulate early reflection characteristics associated with reverberation from a surface proximate to a user of the AR device 102.

In some implementations, the image-based audio modifier 138 is configured to store (or access) a sample library 190 including pre-recorded samples, such as "canned" sound effects and to add one or more samples of the sample library 190 to the audio signal 118 to modify the audio signal 118. As an example, the sample library 190 may include different sounds such as knocking at a wooden table or door, footsteps on a wooden floor, the sound of objects being dragged across a concrete floor, or a creaking sound of a metal door opening, as illustrative examples. The AR device 102 may be configured to perform an image recognition operation using the second image data 110 to identify an object and to access the sample library 190 to retrieve one or more samples based on a type of the object. The image-based audio modifier 138 may be configured to modify the one or more samples based on one or more criteria detected in the second image data 110. As an illustrative example, the image-based audio modifier 138 may perform one or more operations based on a detected (or estimated) size of a table or door, such as by adjusting one or more of amplitude, pitch, damping, or equalization, as illustrative examples.

In a particular example, one or more of the binaural mixers 212, 232, 234 are configured to adjust the audio signal 118 based on a head-related transfer function (HRTF) associated with a user of the AR device 102. For example, the AR device 102 may be configured to binaurally mix the audio signal 118 so that the user perceives audio as originating from a particular location, such as the first location 104 (instead of as originating from the AR device 102).

In some implementations, the AR device 102 is configured to selectively activate one or more components of the image-based audio modifier 138, such as based on the second image data 110. To illustrate, in some cases, no object may be detected between the first location 104 and the second location 106. In this case, the AR device 102 may temporarily power-down (e.g., deactivate or leave in a deactivated state) one or more of the indirect path calculator 222, the occlusion-based filter 226, the occlusion-based attenuator 230, or the binaural mixer 234. As another example, the AR device 102 may power-up one or more of the indirect path calculator 222, the occlusion-based filter 226, the occlusion-based attenuator 230, or the binaural mixer 234 in response to detecting one or more objects (e.g., the object 150) using the second image data 110. Thus, the AR device 102 may be configured to operate or more components of the image-based audio modifier 138 using a first power consumption (e.g., during an active mode of operation) and using a second power consumption (e.g., during a deactivated mode of operation) that is less than the first power consumption, such as by activating the one or more components "as needed" based on the second image data 110.

After modifying the audio signal 118 to generate the modified audio signal 119, the AR device 102 is configured to generate an acoustic representation of the modified audio signal 119. For example, the audio sink 124 may include one or more speakers configured to generate an acoustic representation of the modified audio signal 119.

Use of the image data 109, 110 and the 3D map 112 may increase efficiency of adjusting the audio signal 118 to simulate sound from the first location 104 to the second location 106. As an example, use of the image data 109, 110 and the 3D map 112 may enable faster tracking of a dynamic environment (or a change between environments), such as where a user moves from inside to outside a building or from one room to another room of the building, which may be difficult or infeasible using other techniques.

Figure 3:
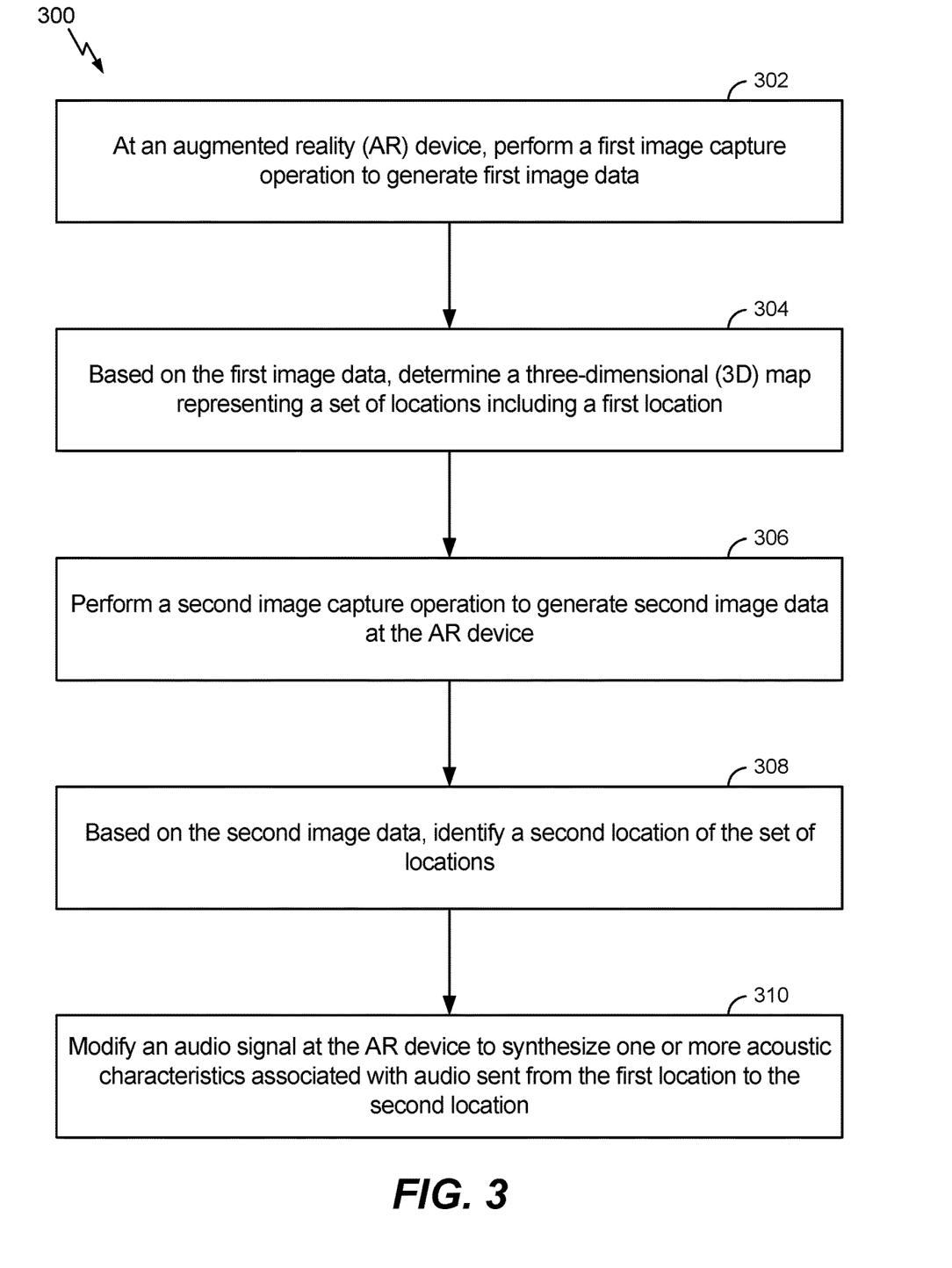
FIG. 3 is a flow diagram of an illustrative example of a method of operation of an AR device, such the AR device of FIG. 1.

Referring to FIG. 3, a particular illustrative example of a method is depicted and generally designated 300. In a particular example, the method 300 is performed by an AR device, such as the AR device 102 of FIGS. 1 and 2.

The method 300 includes performing, at an AR device, a first image capture operation to generate first image data, at 302. To illustrate, the image sensor 108 may perform the first image capture operation to generate multiple images (e.g., multiple separate images, a video stream, or both) included in the first image data 109. In a particular example, the image sensor 108 performs the first image capture operation in connection with a walk-through calibration process (e.g., to "build" the 3D map 112).

The method 300 further includes determining, based on the first image data, a 3D map representing a set of locations including a first location, at 304. For example, the 3D map 112 represents the first location 104. In a particular example, determining the 3D map 112 includes stitching together multiple images included in the first image data 109 to generate a composite image of the set of locations using a panoramic image synthesis technique. In another example, the 3D map 112 may be received by the AR device 102 from another device, such as a server. For example, the AR device 102 may "offload" the first image data 109 to a server to generate the 3D map 112 and may receive the 3D map 112 from the server.

The method 300 further includes performing a second image capture operation to generate second image data at the AR device, at 306. For example, the image sensor 108 may perform the second image capture operation to generate the second image data 110 in connection with a user mode of operation after the walk-through calibration process. The second image data 110 may include one image, multiple images, or a video stream, as illustrative examples.

The method 300 further includes identifying, based on the second image data, a second location of the set of locations, at 308. For example, the AR device 102 may "match" one or more features indicated by the second image data 110 to one or more features indicated by the 3D map 112. In a particular example, the AR device 102 may detect the "match" based on the features satisfying a similarity threshold. To further illustrate, the second location 106 may correspond to a user location of a user of the AR device 102, and the first location may correspond to an audio source location of an audio source (e.g., the audio source 140) to be simulated.

The method 300 further includes modifying an audio signal at the AR device to synthesize (e.g., simulate) one or more acoustic characteristics associated with audio sent from the first location to the second location, at 310. To illustrate, the audio signal 118 may be modified to generate the modified audio signal 119 by equalizing the audio signal 118, binaurally mixing the audio signal 118, artificially reverberating the audio signal 118, performing one or more other operations, or a combination thereof. In a particular illustrative example, the method 300 further includes performing an image recognition operation to identify an object (e.g., a door) represented by the second image data 110, and modifying the audio signal 118 includes accessing the sample library 190 (e.g., at the memory 134) based on the object and adding one or samples of the sample library to the audio signal 118 (e.g., by adding an impact-based sound, such as knocking sound, to the audio signal 118).

Use of the method 300 of FIG. 3 may increase efficiency of adjusting an audio signal 118 to synthesize characteristics of sound from one location to another location. As an example, use of image data and a 3D map may enable faster tracking of a dynamic environment (or a change between environments), such as where a user moves from inside to outside a building or from one room to another room of the building, which may be difficult or infeasible using other techniques.

Figure 4:
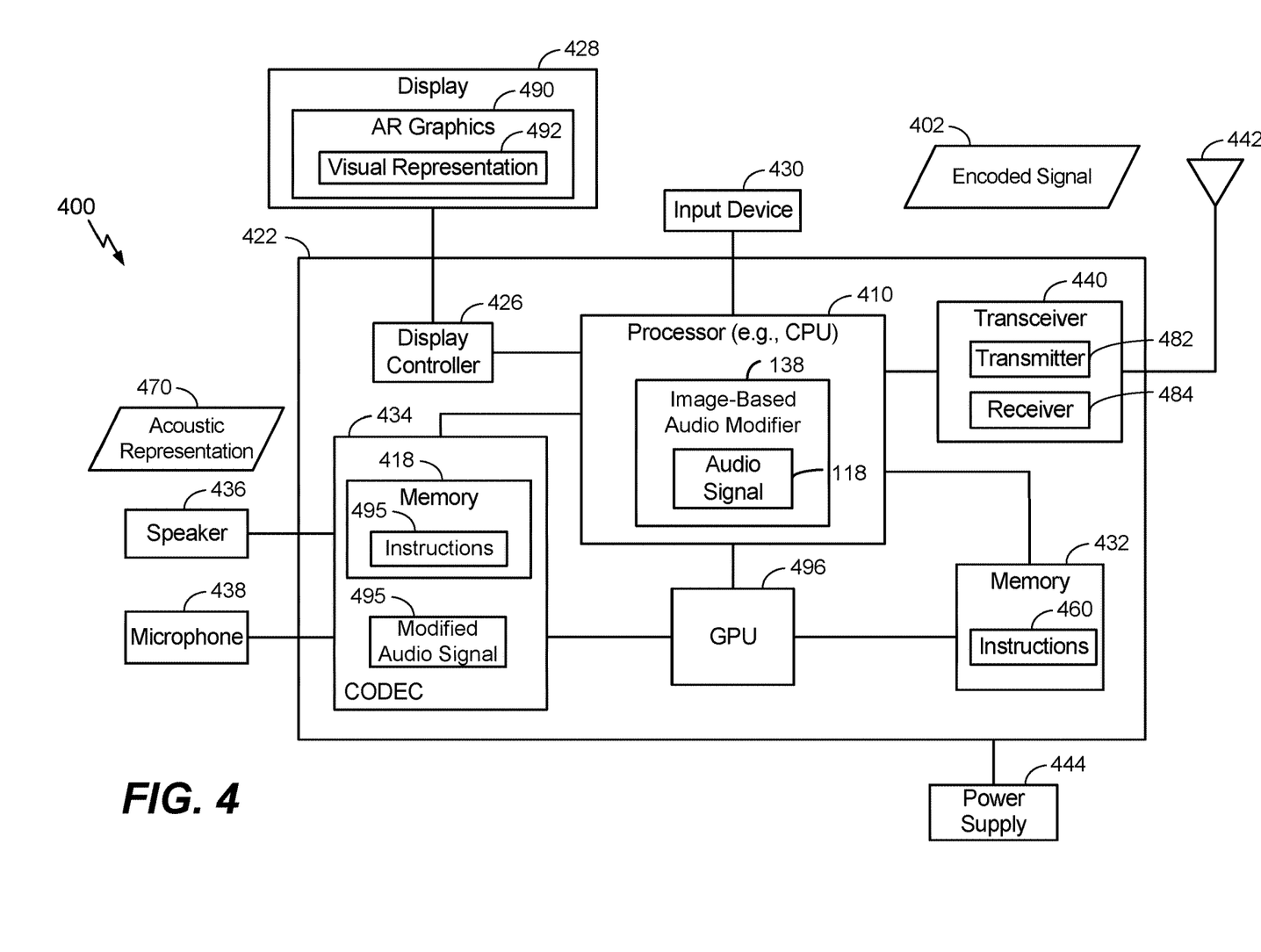
FIG. 4 is a block diagram of an illustrative example of an electronic device, such as the AR device of FIG. 1.

Referring to FIG. 4, a block diagram of a particular illustrative example of an electronic device is depicted and generally designated 400. In an illustrative example, the electronic device 400 corresponds to an AR device, such as the AR device 102. Alternatively or in addition, one or more aspects of the electronic device 400 may be implemented within a mobile device (e.g., a cellular phone), a computer (e.g., a server, a laptop computer, a tablet computer, or a desktop computer), an access point, a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, an Internet of Things (IoT) device, another electronic device, or a combination thereof.

The electronic device 400 includes one or more processors, such as a processor 410 (e.g., the processor 132 of FIG. 1) and a graphics processing unit (GPU) 496. The processor 410 may include a central processing unit (CPU), a digital signal processor (DSP), another processing device, or a combination thereof.

The electronic device 400 may further include one or more memories, such as a memory 432 (e.g., the memory 134 of FIG. 1). The memory 432 may be coupled to the processor 410, to the GPU 496, or to both. The memory 432 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 432 may store instructions 460 (e.g., the instructions 136 of FIG. 1). The instructions 460 may be executable by the processor 410, by the GPU 496, or by both. The instructions 460 may be executable to perform, initiate, or control one or more operations described herein, such as one or more operations described with reference to the method 300 of FIG. 3.

A CODEC 434 can also be coupled to the processor 410. The CODEC 434 may be coupled to one or more microphones, such as a microphone 438. The CODEC 434 may include a memory 418. The memory 418 may store instructions 495 executable by the CODEC 434.

In the example of FIG. 4, the processor 410 includes the image-based audio modifier 138. In alternative implementations, one or more features of the image-based audio modifier 138 may be included in another component of the electronic device 400, such as the CODEC 434.

A speaker 436 may be coupled to the CODEC 434. In a particular example, the speaker 436 corresponds to or is included in the audio sink 124 of FIGS. 1 and 2. The speaker 436 may be configured to generate an acoustic representation 470 of the modified audio signal 119. In a particular illustrative example, the image-based audio modifier 138 is configured to generate the modified audio signal 119 based on the audio signal 118 and to provide the modified audio signal 119 to the CODEC 434. The CODEC 434 may be configured to provide the modified audio signal 119 (or another version of the modified audio signal 119, such as an analog version or a transcoded version of the modified audio signal 119) to the speaker 436 to generate the acoustic representation 470.

FIG. 4 also shows a display controller 426 that is coupled to the processor 410 and to a display 428. In a particular example, the display 428 has a "wrap around" configuration that is configured to sit on the bridge of the nose of a user. In this example, the electronic device 400 may be included in eyewear (e.g., googles) configured to be worn across the eyes of a user.

The display 428 may be configured to present graphics 490 associated with an AR application (e.g., an AR application corresponding to the instructions 460). The graphics 490 include a visual representation 492 associated with audio to be simulated by the modified audio signal 119. As a particular illustrative example, the modified audio signal 119 may indicate a knocking sound of the acoustic representation 470, and the visual representation 492 may include a depiction of a door corresponding to the audio source 140 of FIG. 1. The visual representation 492 may correspond to an actual object that is present at the first location 104 or a virtual object that is to be simulated at the first location 104.

The electronic device 400 may further include a transmitter 482 coupled to an antenna 442. The transmitter 482 may be configured to transmit an encoded signal 402. Alternatively or in addition, the electronic device 400 may include a receiver 484 configured to receive the encoded signal 402. The receiver 484 may be coupled to the antenna 442, to one or more other antennas, or a combination thereof. In the example of FIG. 4, the transmitter 482 and the receiver 484 are included in a transceiver 440.

In a particular example, the processor 410, the GPU 496, the memory 432, the display controller 426, the CODEC 434, and the transceiver 440 are included in a system-on-chip (SoC) device 422. Further, an input device 430 and a power supply 444 may be coupled to the SoC device 422. Moreover, in a particular example, as illustrated in FIG. 4, the display 428, the input device 430, the speaker 436, the microphone 438, the antenna 442, and the power supply 444 are external to the SoC device 422. However, each of the display 428, the input device 430, the speaker 436, the microphone 438, the antenna 442, and the power supply 444 can be coupled to a component of the SoC device 422, such as to an interface or to a controller.

In conjunction with the described embodiments, a computer-readable medium (e.g., any of the memory 134, the memory 418, or the memory 432) stores instructions (e.g., any of the instructions 136, the instructions 460, or the instructions 495) executable by a processor (e.g., the processor 132, the processor 410, or the CODEC 434) to cause the processor to initiate, perform, or control operations. The operations include performing, at an AR device (e.g., the AR device 102 or the electronic device 400), a first image capture operation to generate first image data (e.g., the first image data 109). A 3D map (e.g., the 3D map 112) representing a set of locations including a first location (e.g., the first location 104) is determined based on the first image data. The operations further include performing a second image capture operation to generate second image data (e.g., the second image data 110) at the AR device. A second location (e.g., the second location 106) of the set of locations is identified based on the second image data. The operations further include modifying an audio signal (e.g., the audio signal 118) at the AR device to synthesize (e.g., simulate) one or more acoustic characteristics associated with audio sent from the first location to the second location.

In conjunction with the described embodiments, an apparatus includes means (e.g., any of the memories 134, 418, and 432) for storing instructions (e.g., any of the instructions 136, the instructions 460, or the instructions 495) of an AR application. The apparatus further includes means (e.g., the processor 132 or the processor 410) for executing the instructions to initiate a first image capture operation to generate first image data (e.g., the first image data 109) and to determine a 3D map (e.g., the 3D map 112) based on the first image data. The 3D map represents a set of locations including a first location (e.g., the first location 104). The means for executing is configured to initiate a second image capture operation to generate second image data (e.g., the second image data 110), to execute the instructions to identify, based on the second image data, a second location (e.g., the second location 106) of the set of locations, and to modify an audio signal (e.g., the audio signal 118) to synthesize (e.g., simulate) one or more acoustic characteristics associated with audio sent from the first location to the second location. In a particular example, the apparatus further includes means (e.g., the image sensor 108) for performing the first image capture operation in connection with a walk-through calibration process and for performing the second image capture operation in connection with a user mode of operation. The apparatus may further include means (e.g., the audio sink 124, the speaker 436, or both) for generating an acoustic representation (e.g., the acoustic representation 470) of the modified audio signal.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, "generating," "calculating," "using," "selecting," "accessing," and "determining" may be used interchangeably. For example, "generating," "calculating," or "determining" a value, a characteristic, a parameter, or a signal may refer to actively generating, calculating, or determining a value, a characteristic, a parameter, or a signal or may refer to using, selecting, or accessing a value, a characteristic, a parameter, or a signal that is already generated, such as by a component or a device.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the AR device 102 of FIG. 1 and the electronic device 400 of FIG. 4.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the method 300 of FIG. 3 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. An augmented reality (AR) device comprising:
   a memory configured to store instructions of an augmented reality (AR) application; and
   a processor configured to execute the instructions to:
      initiate a first image capture operation to generate first image data and to determine a three-dimensional (3D) map based on the first image data, the 3D map representing a set of locations including a first location;
      initiate a second image capture operation to generate second image data;
      identify, based on the second image data, a second location of the set of locations;
      determine a first path from the first location to the second location, wherein a user is located at the second location, wherein an audio source to be simulated is located at the first location, and wherein an obstacle is positioned between the first location and the second location; and
      modify an audio signal to a modified audio signal to synthesize one or more acoustic characteristics of sound sent from the first location to the second location based on the first path, including filtration of the audio signal, attenuation of the audio signal, and binaural mixing of the audio signal.

2. The AR device of claim 1, further comprising an image sensor configured to perform the first image capture operation in connection with a walk-through calibration process and to initiate the second image capture operation in connection with a user mode of operation.

3. The AR device of claim 1, further comprising one or more speakers configured to generate an acoustic representation of the modified audio signal.

4. The AR device of claim 1, further comprising a display configured to present graphics associated with the AR application, the graphics including a visual representation associated with the sound.

5. The AR device of claim 1, further comprising an infrared sensor, wherein data from the infrared sensor is used to determine dimensions of a room represented by the 3D map.

6. The AR device of claim 1, wherein the first path is a direct path from the first location to the second location.

7. The AR device of claim 1, wherein modification of the audio signal further includes adjustment of the audio signal based on a higher order reflection characteristic associated with a room represented by the 3D map.

8. The AR device of claim 1, wherein modification of the audio signal further includes artificial reverberation added to the audio signal.

9. The AR device of claim 1, wherein the first path is an indirect path from the first location to the second location.

10. The AR device of claim 9, wherein the indirect path is around the obstacle.

11. The AR device of claim 1, wherein the processor is further configured to modify the audio signal based on one or more audio characteristics correlated to dimensions of a room represented by the 3D map, wall characteristics of the room, or both.

12. The AR device of claim 1, wherein the processor is further configured to modify the audio signal by equalizing the audio signal, artificially reverberating the audio signal, or a combination thereof.

13. The AR device of claim 1, further comprising an infrared sensor, wherein data from the infrared sensor is used to determine locations of one or more objects in a room represented by the 3D map.

14. The AR device of claim 1, wherein the processor is further configured to identify an object based on one or more of the first image data or the second image data, and wherein the one or more acoustic characteristics are correlated to dimensions of the object, a type of the object, a material of the object, or a combination thereof.

15. The AR device of claim 14, wherein the audio signal corresponds to an impact-based sound, and wherein the processor is configured to modify the audio signal based on the dimensions of the object, the type of the object, the material of the object, or a combination thereof.

16. The AR device of claim 1, wherein the processor is further configured to associate particular acoustic characteristics with features identified in the 3D map, the particular acoustic characteristics including distance between features and at least one of reverberation, absorption, or attenuation.

17. The AR device of claim 16, wherein the processor is further configured to adjust the audio signal based on a lower order reflection characteristic associated with a particular location within a room represented by the 3D map.

18. A method of operation of a device, the method comprising:
at an augmented reality (AR) device, performing a first image capture operation to generate first image data;
based on the first image data, determining a three-dimensional (3D) map representing a set of locations including a first location;
performing a second image capture operation to generate second image data at the AR device;
based on the second image data, identifying a second location of the set of locations;
determining, at the AR device, a direct path from the first location to the second location, the direct path through an obstacle positioned between a user and an audio source to be simulated; and
modifying, at the AR device, an audio signal to synthesize one or more acoustic characteristics of sound sent from the first location to the second location based on the direct path using an obstacle-based filter and an obstacle-based attenuator to attenuate the audio signal.

19. The method of claim 18, wherein determining the 3D map includes stitching together multiple images included in the first image data to generate a composite image of the set of locations using a panoramic image synthesis technique.

20. The method of claim 18, wherein modifying the audio signal includes artificially reverberating the audio signal.

21. The method of claim 18, wherein the first image capture operation is performed in connection with a walk-through calibration process, and wherein the second image capture operation is performed in connection with a user mode of operation.

22. The method of claim 18, wherein the second location corresponds to a user location, and wherein the first location corresponds to an audio source location of an audio source to be simulated.

23. The method of claim 18, further comprising performing an image recognition operation to identify an object represented by the second image data, wherein modifying the audio signal includes accessing a sample library based on the object and adding one or more samples of the sample library to the audio signal.

24. A non-transitory computer-readable medium storing instructions executable by a processor to initiate, perform, or control operations to:
based on first image data associated with an augmented reality (AR) device, determine a three-dimensional (3D) map representing a set of locations including a first location;
based on second image data associated with the AR device, identify a second location of the set of locations;
determine an indirect path from the first location to the second location using an indirect path calculator of the AR device, the indirect path around one or more obstacles positioned between a user and an audio source to be simulated; and
modify an audio signal to synthesize one or more acoustic characteristics of sound sent from the first location to the second location based on the indirect path using an occlusion-based filter and an occlusion-based attenuator.

25. The non-transitory computer-readable medium of claim 24, wherein determining the 3D map includes stitching together multiple images included in the first image data to generate a composite image of the set of locations using a panoramic image synthesis technique.

26. The non-transitory computer-readable medium of claim 24, wherein operations to modify the audio signal include artificially reverberating the audio signal.

27. The non-transitory computer-readable medium of claim 24, wherein the first image data is captured during a walk-through calibration process for the AR device, and wherein the second image data is captured during a user mode of operation of the AR device.

28. The non-transitory computer-readable medium of claim 24, wherein the second location corresponds to a user location, and wherein the first location corresponds to an audio source location of an audio source to be simulated.

29. An apparatus comprising:
means for storing instructions of an augmented reality (AR) application; and
means for executing the instructions to:
initiate a first image capture operation to generate first image data and to determine a three-dimensional (3D) map based on the first image data, the 3D map representing a set of locations including a first location;
initiate a second image capture operation to generate second image data;
identify, based on the second image data, a user located at a second location of the set of locations, and an obstruction between the first location and the second location;
determine a first path from the first location to the second location; and
modify an audio signal to a modified audio signal to synthesize one or more acoustic characteristics of sound sent from a simulated audio source at the first location to the second location based on the first path, including filtration of the audio signal, attenuation of the audio signal, and binaural mixing of the audio signal.

30. The apparatus of claim 29, further comprising:
means for performing the first image capture operation in connection with a walk-through calibration process and for performing the second image capture operation in connection with a user mode of operation; and means for generating an acoustic representation of the modified audio signal.

* * * * *